No. 822,501. PATENTED JUNE 5, 1906.
O. BECKER.
MAGAZINE FILM HOLDER.
APPLICATION FILED JUNE 15, 1905.
4 SHEETS—SHEET 1.
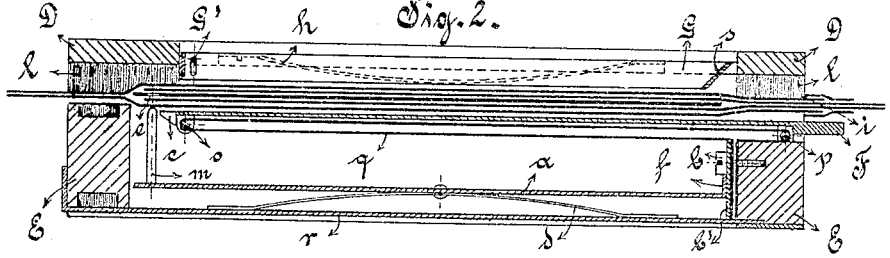
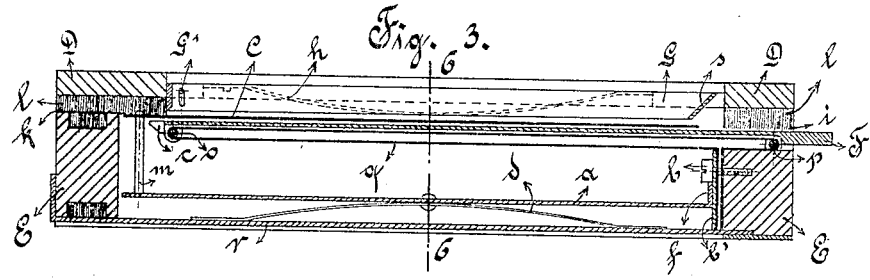
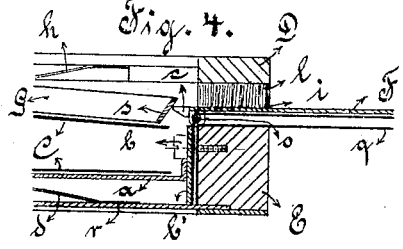 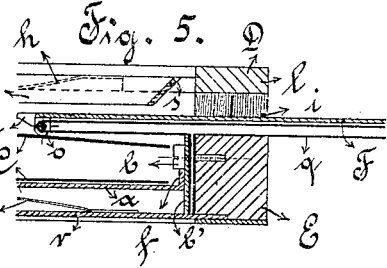
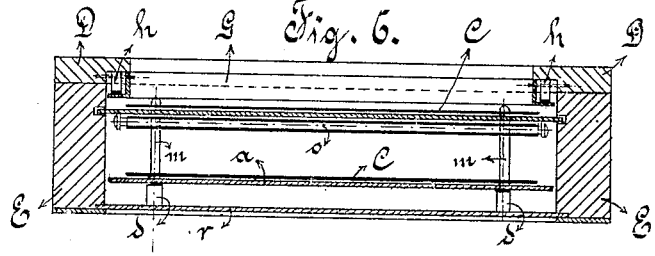
Witnesses
T. P. Britt
E. C. Duffy
Inventor
Oscar Becker
By C. E. Duffy
Attorney No. 822,501. PATENTED JUNE 5, 1906.
O. BECKER.
MAGAZINE FILM HOLDER.
APPLICATION FILED JUNE 15, 1905.
4 SHEETS—SHEET 2.
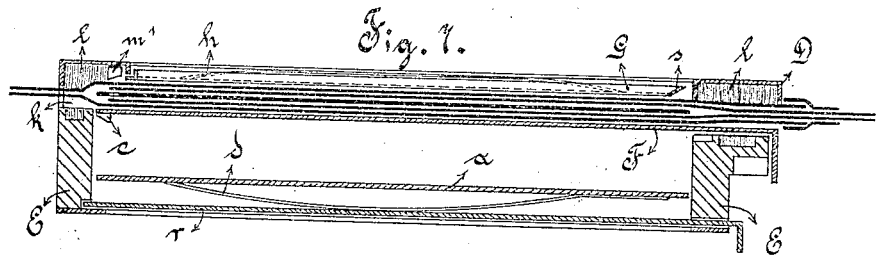
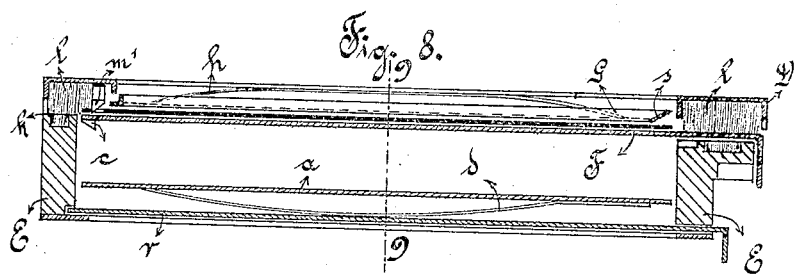
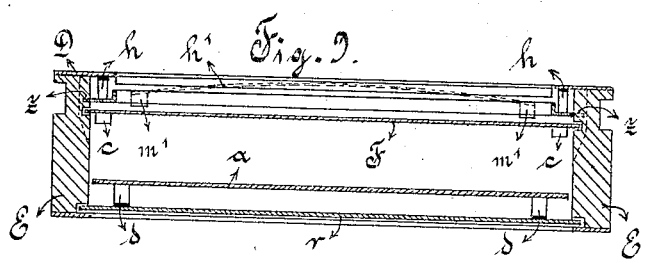
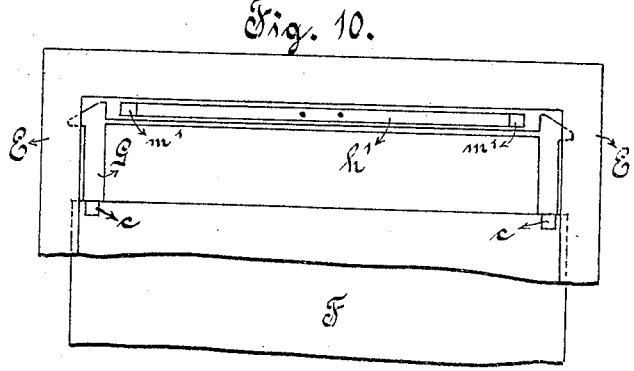
Witnesses
Inventor
Oscar Becker
By O. E. Duffy & Son
Attorneys

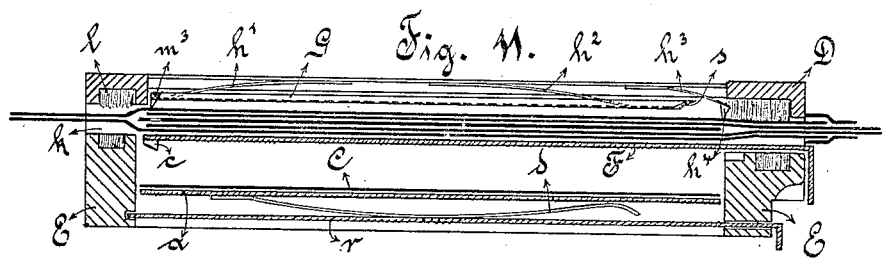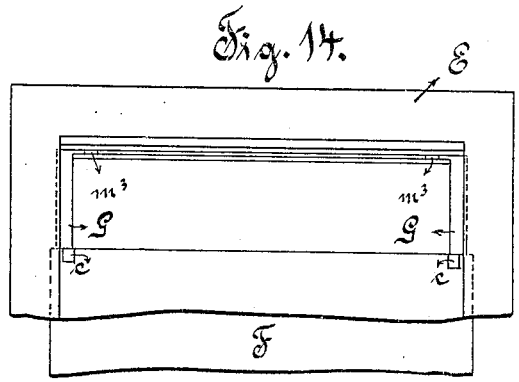

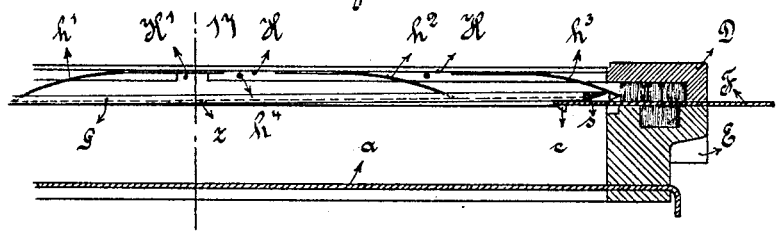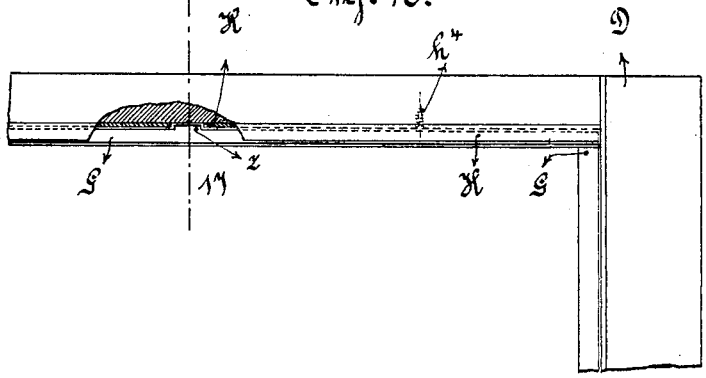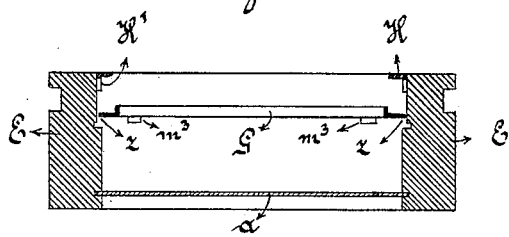

UNITED STATES PATENT OFFICE.

OSCAR BECKER, OF BERLIN, GERMANY.

MAGAZINE FILM-HOLDER.

No. 822,501.   Specification of Letters Patent.   Patented June 5, 1906.

Application filed June 15, 1905. Serial No. 265,409.

*To all whom it may concern:*

Be it known that I, OSCAR BECKER, a subject of the German Emperor, residing at 62 Jerusalemerstrasse, Berlin, S. W. 19, Germany, have invented certain new and useful Improvements in a Magazine Film-Holder, of which the following is a specification.

The present invention relates to a magazine film-holder for photographic cameras or like apparatus adapted for use with a packet for sensitized photographic surfaces, which I have described in my patent application, Serial No. 265,410, of even date herewith.

The apparatus which forms the subject-matter of the present invention comprises in suitable combination three working parts, one adapted to move so as to allow the packet to be slid into proper position in the film-holder, another to insure the correct placing of the film in the plane of the focus of the camera-lens and to hold it in such place when the envelops are being and have been withdrawn, and the third adapted to slide so as to open the magazine to allow the exposed film or paper to enter thereinto and to close the magazine again in light-tight manner.

In the accompanying drawings, Figure 1 is a longitudinal section of the packet containing a film. Fig. 2 is a longitudinal section of the magazine film-holder with the packet in place. Fig. 3 is the same section, the envelops having been withdrawn. Fig. 4 is a part longitudinal section showing the position of the parts when the holder is fully withdrawn to open the magazine. Fig. 5 is the same section showing the position of the parts when the holder has been partly returned and is forcing the film down into the magazine. Fig. 6 is a cross-section of the apparatus on line 6 6 of Fig. 3. Fig. 7 is a longitudinal section of a modification of the magazine film-holder with the packet in place. Fig. 8 is the same section, the envelops having been removed. Fig. 9 is a cross-section on line 9 9 of Fig. 8. Fig. 10 is an underside plan of the magazine from which the bottom and the film-supporting plate have been removed and in which the holder for opening the magazine has been partially withdrawn. Fig. 11 is a longitudinal section of a second modification of the magazine film-holder with the packet in place. Fig. 12 is the same section with the envelops withdrawn. Fig. 13 is a cross-section on line 13 13 of Fig. 12. Fig. 14 is a part under side plan of the magazine from which the bottom, the film-support, and the films have been removed and in which the holder for opening the magazine has been partially withdrawn. Fig. 15 is a longitudinal section. Fig. 16 is a plan view in which a part of the ledge H is cut out to clearly show the projections z, and Fig. 17 is a cross-section on line 17 17 of Figs. 15 and 16.

In all the figures like parts are indicated by like reference-letters.

The said packet is shown in section in Fig. 1 of the accompanying drawings. It consists of two envelops A and B, open at one side only and made of black paper or card. The sensitized film or the like C having been placed in envelop A, the latter inserted in envelop B with its open side innermost, and the open side of envelop B, which is contracted into the form shown in the figure, is made light-tight by inserting its edges into the spaces formed by two fillets B', of black paper or card, attached to the closed side of envelop A. These operations having been performed in the dark room, such as when the film was sent out of the factory, the inclosure may be used in daylight by inserting it in the apparatus about to be described. Envelop B is then withdrawn from the film, to be followed by the withdrawal of envelop A.

Referring first to Figs. 1 to 6, the magazine E is held by spring-pressure against a frame D, from which it can be moved away to form slits *i* and *k* for the purpose of inserting the packet shown in Fig. 1 into the position shown in Fig. 2, in which position it rests against the slide F, that forms the face of the magazine. In this position the packet is pressed upon by a frame G, mounted within frame D and urged toward the slide F by springs *h*. Strips of velvet *l* make a light-tight closure between the frame D and the walls of the magazine E.

The film C has two perforations *e* at the edge which is to the left hand in the figures, and the inner envelop A is cut away to leave these perforations uncovered when the outer envelop B has been withdrawn through the slit *k*. As soon as this has happened two pins *m*, fixed to a plate *a*, urged forward by springs *d*, interposed between the said plate and the sliding bottom *r* of the magazine, enter the perforations *e*, as shown in Fig. 3. It is now possible to withdraw envelop A through slit *i* without shifting the film C, which is then immediately pressed by the spring-frame G and held thereby against the slide F ready for exposure.

After exposure the film is to be transferred to the magazine. For this purpose the slide F is withdrawn until the projections $c$ on its left-hand edge catch against the side of the magazine. The frame G has its right-hand side beveled or sloping, as at $s$, and at a short distance from its opposite side it is connected by slots and pins G' with the frame D. Hence when the slide F is withdrawn the beveled side $s$ of the frame G falls until it rests on the edge of the slide, as shown in Fig. 4, bringing with it the film C. The slide F is now returned and in its inward movement slides against the side $s$ and lifts the frame G back to its former position. At the same time the slide engages the film C, Fig. 5, and causes it to travel down the pins $m$ until it rests on the plate $a$ or on the films already in the magazine. In order that the film may not be damaged by the edge of the slide, the latter carries two rollers $o\ p$, over which passes a band $q$, the ends whereof are clamped by a plate $b'$ to the side of the magazine E by screws $b$. These screws also serve as an abutment for a flange $f$ on the edge of the plate $a$ to prevent the latter from being moved too far by the springs $d$. The exposed films are removed for development by withdrawing the bottom $r$ and taking out the plate $a$.

A somewhat simplified construction is shown in Figs. 7 to 10, wherein there are substituted for the pins $m$, attached to the plate $a$ of the former construction, pins $m'$, attached to a spring $h'$ in the frame D. As shown in Fig. 7, these pins are prevented from entering the perforations $e$ in the film C by the outer envelop B; but when this is withdrawn they take the position within the perforations as shown in Fig. 8. In this modification the two rollers $o\ p$ and the band $q$ are omitted, as in practice it seldom happens that the film is damaged by the edge of the slide. In this form also the plate $a$, not having any pins, does not need any abutment within the magazine.

In the modification shown in Figs. 11 to 17 the pins $m^3$ are attached to the frame G and enter the perforations $e$ as soon as the outer envelop B has been withdrawn. This involves the necessity for the left-hand side of the frame G having play in the direction of the magazine as well as the right-hand side. For this purpose the springs $h'\ h^2$ are attached to two small ledges H of rectangular (⌐) section and made of a thin metal, one on each side along the inner board of frame D, Figs. 15 and 16, and which ledges are fixed each by means of two small screws $h^4$. (See Figs. 15 and 16.) Now the frame G, which is also of rectangular (L) section, (compare Figs. 13 and 17,) has two small projections $z$, Fig. 16, one on each side. These projections correspond with two places H' of the ledge H, each on one side, at which the ledge H is cut out for a small distance. This arrangement enables, first, that the frame G, which when the slide F is pushed home rests on the slide F, can move toward the ledges H, when a packet containing a film is pushed in, the projections $z$ entering the above-described places H' of the ledges H and the springs $h'$ and $h^2$ being a little straightened out. Then if the envelops are withdrawn the frame G descends a little toward the slide F, forming the face of the magazine, the pins $m^3$ entering the perforations $e$ and the film C being pressed against the slide by means of the springs $h'\ h^2$. If after exposure the slide F is withdrawn, the frame G by the action of the springs $h'\ h^2$ descends farther toward the magazine, the beveled side $s$ resting on the edge of the slide F. However, the side of the frame G opposite to the beveled side $s$ also descends toward the magazine; but as the frame E is narrower below the slide than above it, forming thus a narrow shoulder, (compare Figs. 13 and 17,) the small projections $z$ rest thereon.

On the right-hand side of frame D are fixed two springs $h^3$, having each a hook $h^4$, which hooks bear, respectively, on the edges of the slide F, so as more surely to prevent the film from being shifted as the slide F is withdrawn. The beveled side $s$ of the frame G is made somewhat flatter in this modification than in the preceding ones.

Having thus described the nature of my said invention and the best means I know of carrying the same into practical effect, I claim—

1. A magazine film-holder comprising in combination a magazine, a sliding cover thereto, a movable frame adapted to hold a sensitized surface against the said cover and means for preventing the said sensitized surface from lateral displacement, substantially as described.

2. A magazine film-holder comprising in combination a magazine, a sliding cover thereto, a movable frame, springs adapted to keep the said frame against the said cover, a beveled side to the said frame adapted to rest on the edge of the withdrawn cover, and means for preventing from lateral displacement a sensitized surface placed in the film-holder, substantially as described.

3. A magazine film-holder comprising in combination a frame, a magazine adapted to fit against the said frame, a smaller frame within the said frame, a sliding cover to the said magazine, springs adapted to urge the said smaller frame against the said cover, a beveled side to the said smaller frame adapted to rest on the edge of the said cover when the latter is withdrawn, and means for preventing from lateral displacement a sensitized surface placed in the film-holder, substantially as described.

4. A magazine film-holder comprising in combination a magazine, a sliding cover thereto, a movable frame adapted to hold a sensitized surface against the said cover and pins carried by the said frame and adapted to prevent lateral displacement of the said sensitized surface, substantially as described.

5. A magazine film-holder for carrying a sensitized surface comprising in combination a magazine, a sliding cover thereto, a movable frame, springs adapted to keep the said frame against the said cover, a beveled side to the said frame adapted to rest on the edge of the withdrawn cover, and pins carried by the said frame and adapted to prevent lateral displacement of the said sensitized surface, substantially as described.

6. A magazine film-holder for carrying a sensitized surface, comprising in combination a frame, a magazine adapted to fit against the said frame, a smaller frame within the said frame, a sliding cover to the said magazine, springs adapted to urge the said smaller frame against the said cover, a beveled side to the said smaller frame adapted to rest on the edge of the said cover when the latter is withdrawn, and pins carried by the said smaller frame and adapted to prevent lateral displacement of the said sensitized surface, substantially as described.

7. In combination, a sensitized surface, means for inclosing the said surface, a magazine film-holder comprising two parts adapted to be separated to receive the said inclosing means, means adapted to insure the correct placing and retention of the said sensitized surface in the said film-holder when the said inclosing means are being and have been withdrawn, and a sliding cover to the said magazine adapted to support the said sensitized surface and when withdrawn to admit it into the said magazine, substantially as described.

8. In combination, a sensitized surface provided with perforations, an envelop inclosing the said surface save the perforated part thereof, an outer envelop inclosing the first-named envelop, a magazine, a frame fitting thereagainst, the said frame and magazine being adapted to be moved apart to receive the said envelops, a sliding cover to the magazine, pins adapted to enter the said perforations when the said outer envelop is withdrawn, and means adapted to hold the said sensitized surface against the said cover, substantially as described.

9. In combination, a sensitized surface, provided with perforations, an inner inclosing means for said surface, save the perforated part thereof, an outer inclosing means for said inner inclosing means, a magazine, a frame fitting thereagainst, the said frame and magazine being adapted to be moved apart to receive the two said inclosing means, a sliding cover to the said magazine, a smaller frame within the said frame, springs adapted to urge the said smaller frame toward the said cover, a beveled surface to the said smaller frame adapted to rest on the edge of the said cover when it is withdrawn, and pins carried by the said smaller frame and adapted to enter the said perforations when the said outer inclosing means has been withdrawn, substantially as described.

In testimony whereof I have signed my name to this specification in the presence of two subscribing witnesses.

OSCAR BECKER.

Witnesses:
 WOLDEMAR HAUPT,
 HENRY HASPER.